United States Patent
Kisselmann et al.

[15] 3,696,295
[45] Oct. 3, 1972

[54] BALANCING MEANS FOR MOVING COILS OF ELECTRICAL MEASURING INSTRUMENTS

[72] Inventors: Willy Kisselmann, Munich, Neugrunwald; Fritz Rumpelein, Munich; Paul Kopf, Unterhaching, all of Germany

[73] Assignee: Agfa-Gevaert Aktiengesellschaft, Leverkusen, Germany

[22] Filed: Sept. 11, 1970

[21] Appl. No.: 71,510

[30] Foreign Application Priority Data

Sept. 16, 1969 Germany..........P 19 46 818.9

[52] U.S. Cl. ..........................324/154 PB, 116/136.5
[51] Int. Cl. .................................................G01r 1/00
[58] Field of Search .....................324/154; 116/136.5

[56] References Cited

UNITED STATES PATENTS

| | | | |
|---|---|---|---|
| 1,844,529 | 2/1932 | Stickney | 116/136.5 |
| 1,861,255 | 5/1932 | Arey | 116/136.5 |

*Primary Examiner*—Alfred E. Smith
*Attorney*—Michael S. Striker

[57] ABSTRACT

A fully assembled moving coil assembly for use in D'Arsonval and like electrical measuring instruments includes a disk-shaped plastic balancing element which is integral with the pointer and with a portion of one of the bearing members and is formed with one or more annuli of equidistant bores for reception of pin-shaped counterweights. The center of each annulus is located on the pivot axis of the moving coil assembly. One or more counterweights are inserted into and snugly received in selected bores after the assembly is tested in a suitable apparatus which determines the location of the unbalance.

12 Claims, 1 Drawing Figure

PATENTED OCT 3 1972
3,696,295
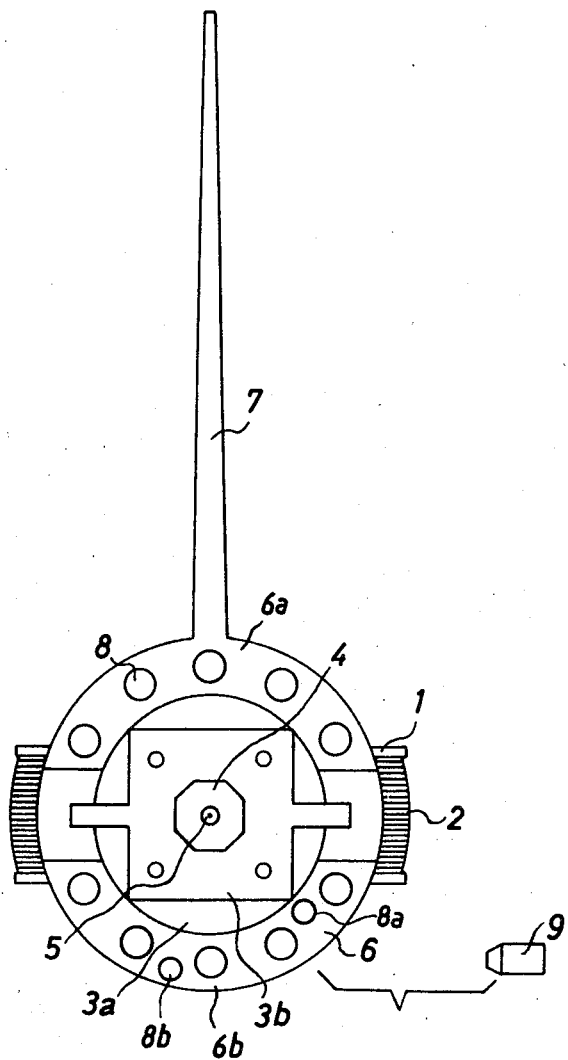
INVENTOR
BY WILLY KISSELMANN
FRITZ RÜMPELEIN
PAUL KOPF

BALANCING MEANS FOR MOVING COILS OF ELECTRICAL MEASURING INSTRUMENTS

BACKGROUND OF THE INVENTION

The present invention relates to electrical measuring instruments in general, and more particularly to improvements in so-called moving coil instruments wherein a coil which is mounted on a suitable frame is pivotable about a predetermined axis and is provided with a pointer which moves with reference to the graduations of a dial or scale. The frame carries two coaxial bearing pins which extend into jewel bearings or like bearings in the housing of the measuring instrument.

The balancing of moving coil assemblies (including the coil-form or frame, the coil, the pointer and the bearing pins) presents serious problems. Such assemblies must be balanced with a very high degree of precision to insure accurate measurements. One of the presently employed methods of balancing miniature moving coil assemblies includes the application of solder drops to a counterweight which is mounted on a balance arm of the frame. It is extremely difficult to attach a droplet of solder to a miniature balancing arm or to a counterweight on such balancing arm, but it is still more difficult to properly meter the amounts of solder to insure accurate balancing. Such work involves much experience and care, it consumes much time, and it must be performed by highly skilled workmen.

It was further proposed to balance the moving coil assembly of an electrical measuring instrument by employing a plate-like counterweight whose mass is selected in such a way that, even by overdimensioning each and every such part of the moving coil assembly which is located opposite the counterweight, and by further assuming that the mass of the counterweight is at the lower limit of its permissible weight range; the cause of unbalance is still in the counterweight. Once the assembled moving coil assembly is placed into a testing apparatus which has determined that the mass of the counterweight is excessive, some material is removed from the counterweight by suitable material removing tools. Such tools must remove minute quantities of material at one or more points of the small counterweight so that this method of balancing, too, invariably requires much time and skilled work.

SUMMARY OF THE INVENTION

An object of the invention is to provide a moving coil assembly for use in electrical measuring instruments with novel and improved balancing means which can be rapidly, accurately and conveniently manipulated to insure proper balance of the assembly prior to insertion into the housing of the measuring instrument.

Another object of the invention is to provide a balancing means which requires no machining or soldering subsequent to completion of the assembly of the moving coil with its frame and other movable parts, and which can be manipulated by persons of average skill.

A further object of the invention is to provide a moving coil assembly with balancing means which can be manipulated or adjusted upon completed assembly of the moving parts in such a way that the manipulation or adjustment does not result in deformation, breakage or other damage.

An additional object of the invention is to provide a novel and improved method of balancing moving coil assemblies for use in electrical measuring instruments, particularly in D'Arsonval type moving coil instruments.

The invention is embodied in a moving coil assembly for use in electrical measuring instruments. The assembly comprises a preferably flanged coil-form or frame, at least one coil which is convoluted around the frame, a pointer which is supported by the frame, bearing means supported by the frame and defining a pivot axis for the moving coil assembly (such bearing means preferably comprises two coaxial bearing members which are mounted at the opposite sides of the frame), and balancing means comprising a preferably disk-shaped balancing element which is supported by the frame and at least partially surrounds the bearing means. The balancing element is provided with at least one group of sockets, preferably in the form of holes or bores, or reception of preferably pin-or stud-shaped counterweights. The sockets are equidistant from the pivot axis and are preferably also equidistant from each other. One or more counterweights are inserted into selected sockets upon completed assembly of the above-enumerated parts and while the moving coil assembly is tested in an apparatus to determine the location of the unbalance.

The balancing element preferably consists of synthetic plastic material and is preferably integral with the pointer and with a portion of one of the bearing members. The thickness of the balancing element can vary in such a way that the element comprises a portion of the minimum thickness which is adjacent to the inner end of the pointer and a portion of maximum thickness which is located diametrically opposite the inner end of the pointer (with reference to the pivot axis of the moving coil assembly).

The novel features which are considered as characteristic of the invention are set forth in particular in the appended claims. The improved moving coil assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic plan view of a moving coil assembly having balancing means which embodies one form of the invention.

DESCRIPTION OF THE PREFERRED EMBODIMENTS

The drawing illustrates a moving coil assembly which can be utilized in electrical measuring instruments, particularly in instruments of the D'Arsonval type generally known as galvanometers. The numeral 1 denotes a flanged frame or coil-form which supports a winding or coil 2. The frame 1 further supports an intermediate member or carrier 3a which is provided or connected with a holder 4 for a bearing pin 5. The carrier 3a extends behind the frame 1 where it supports a second holder 4 and a second bearing pin 5. The two bearing pins 5 are receivable in customary jewel bearings or like bearings provided therefor in the housing of the electrical instrument and define a pivot axis for the moving coil assembly. Each bearing pin 5 forms with the respective holder a bearing member a portion of which (namely the holder 4) preferably consists of synthetic plastic material.

The carrier 3a further supports a metallic plate 3b and a novel disk-shaped balancing element 6 which is integral with an elongated pointer 7. The parts 4, 6 and 7 are preferably made of lightweight synthetic plastic material. In accordance with a feature of the invention, the center of the balancing element 6 is located on the common axis of the bearing pins 5 and this balancing element is provided with a least one group or annulus of identical equidistant sockets in the form of bores or holes 8 for minute counterweights in the form of metallic or plastic studs or inserts 9. The axes of the sockets 8 are preferably parallel to the common axis of the bearing pins 5. The angular distance between the centers of neighboring sockets 8 is preferably small to facilitate more accurate balancing of the moving coil assembly.

Once the parts 1–7 are assembled in a manner as shown in the drawing, the resulting moving coil assembly is tested, for example, in a suitable electronic measuring apparatus of known design, to determine the location of unbalance. The counterweight 9 is then inserted into that socket 8 which is located diametrically opposite such point. If necessary, two or more counterweights 9 can be used. It was found that such method of balancing the moving coil assembly saves much time and is far more accurate than presently known methods. The counterweights 9 are preferably a tight fit so that they remain properly anchored in their sockets; they may but need not be glued or otherwise bonded to the balancing element 6.

It is clear that the improved balancing means is susceptible of many modifications without departing from the spirit of the invention. For example, the sockets 8 need not be of circular outline and the balancing element 6 can be provided with two or more concentric groups or annuli of sockets which may but need not have identical dimensions. The drawing shows, by way of example, one socket 8a of a second annulus whose diameter is smaller than the diameter of the annulus of sockets 8, and one socket 8b of a third annulus whose diameter exceeds the diameter of the annulus of sockets 8. The sockets 8a and 8b are preferably equidistant from each other and they preferably alternate with the sockets 8. The balancing element 7 is provided with two or more annuli of sockets if it is desired to effect an extremely accurate balancing of the moving coil assembly. Since the distance between the sockets 8 cannot be reduced at will, the number of counterweights 9 which can be inserted into these sockets opposite the location of an unbalance is also limited. By providing the balancing element 6 with several annuli of sockets in such a way that the sockets of adjoining annuli are staggered with reference to each other in the circumferential direction of the balancing element, the number of counterweights 9 which are to be inserted diametrically opposite the location of unbalance can be increased to insure more accurate balancing; also, the positions of the inserted counterweights with reference to the location of unbalance can be selected with a much higher degree of accuracy.

It is further within the purview of the invention to employ a discrete pointer which is separably or permanently attached to the element 6 or to another part of the assembly.

The thickness of the balancing element 7 may but need not be constant. It is preferred to shape the element 6 in such a way that it has a portion 6a of minimum thickness at the inner end of the pointer 7 and a portion 6b of maximum thickness diametrically opposite the portion 6a.

The sockets 8, 8a and/or 8b can constitute recesses, i.e., blind bores or holes which need not extend through the entire balancing element 6. Regardless of their shape and/or depth, such sockets are designed to receive counterweights 9 to thus insure accurate, rapid and convenient balancing of the completed moving coil assembly. Bores or holes of circular outline are preferred at this time because they can be machined into the element 6 with a high degree of accuracy and in a time-saving operation. Since the sockets can be machined or otherwise formed in the bearing element 6 prior to assembly of such element with the remaining movable parts of the measuring instrument, the completed assembly need not be subjected to any machining (such as drilling, shaving or the like) for the purpose of removing surplus material or to soldering for the purpose of adding material.

It is clear that the disk-shaped balancing element 6 can be replaced with one or more arms which are provided with one or more sockets for minute counterweights. However, the disk-shaped balancing element has been found to exhibit several important advantages, for example, that it need not have two or more balancing arms. Moreover, a disk-shaped balancing element can be mass-produced at a low cost and, if desired, it may have a uniform thickness. The weight of one or more parts of the element 6 need not exceed the weight of the remaining part or parts because the counterweights 9 can be used to add weight wherever necessary.

Another important advantage of the illustrated balancing means is that the balancing element 6 is integral with and thus serves as a support for the holder 4 of one of the bearing pins 5. Thus, the parts 4, 6 (and preferably also the part 7) can be made in a single mold or form to achieve additional savings in time and machinery. Furthermore, such construction insures (or renders it more possible) that the center of the annulus of sockets 8, 8a and/or 8b is located on the axis of the respective bearing pin 5. Such concentricity of the annuli of sockets and of bearing pins 5 is desirable to insure that the balancing means may employ counterweights of identical size, shape and weight. It will be noted that the bearing element 6 surrounds the illustrated bearing pin 5 and its holder 4; this is of advantage for the aforementioned reasons, mainly because it renders it possible to provide the element 6 with one or more annuli of sockets which are concentric with each other and whose centers are located on the pivot axis of the moving coil assembly. The function of the metallic plate 3b is the same as the function of the holder 53 in the copending application, Ser. No. 830,328 filed by Kisselmann et al. on June 4, 1969.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A moving coil assembly for use in electrical measuring instruments, comprising a frame; a coil convoluted around said frame; a pointer supported by said frame; bearing means supported by said frame and defining a pivot axis for said assembly; and balancing means comprising a substantially annular one-piece balancing element supported by said frame and at least partially surrounding said bearing means, said balancing element being rigid with said pointer and having at least one group of equidistant sockets for reception of prefabricated counterweights, the total number of said sockets exceeding three and the sockets of said one group being equidistant from said pivot axis.

2. A moving coil assembly as defined in claim 1, wherein said bearing means comprises two coaxial bearing members disposed at the opposite sides of said frame, said balancing element surrounding one of said bearing members.

3. A moving coil assembly as defined in claim 1, wherein said sockets are configurated to accommodate pin-shaped counterweights.

4. A moving coil assembly as defined in claim 1, wherein said balancing element is a disk and wherein said one group of sockets forms an annulus whose center is located on said pivot axis.

5. A moving coil assembly as defined in claim 1, wherein said sockets are bores.

6. A moving coil assembly as defined in claim 1, wherein said bearing means comprises two coaxial bearing members disposed at the opposite sides of said frame, one of said bearing members being mounted on said balancing element.

7. A moving coil assembly as defined in claim 1, wherein said balancing element comprises a relatively thin first portion adjacent to said pointer and a relatively thick second portion disposed substantially diametrically opposite said first portion with reference to said pivot axis.

8. A moving coil assembly for use in electrical measuring instruments, comprising a frame; a coil convoluted around said frame; a pointer supported by said frame; bearing means supported by said frame and defining a pivot axis for said assembly; and balancing means comprising a balancing element supported by said frame and at least partially surrounding said bearing means, said balancing element having at least two groups of sockets for reception of balancing counterweights, one of said groups of sockets forming a first annulus whose center is located on said pivot axis and another of said groups of sockets forming a second annulus which is concentric with said first annulus, the diameter of one of said annuli exceeding the diameter of the other annulus.

9. A moving coil assembly as defined in claim 8, wherein said sockets of said second annulus alternate with the sockets of said first annulus, as considered in the circumferential direction of said annuli.

10. A moving coil assembly as defined in claim 1, wherein said balancing element consists of synthetic plastic material.

11. A moving coil assembly as defined in claim 1, wherein said pointer consists of synthetic plastic material.

12. A moving coil assembly as defined in claim 1, wherein said bearing means comprises two coaxial bearing members disposed at the opposite sides of said frame and wherein a portion of one of said bearing members is integral with said balancing element, said pointer also being integral with said balancing element, and said balancing element, said portion of said one bearing member and said pointer consisting of synthetic plastic material.

* * * * *